United States Patent
Lal et al.

[11] Patent Number: 5,922,442
[45] Date of Patent: Jul. 13, 1999

[54] MAGNETIC RECORDING MEDIUM HAVING A COCR ALLOY INTERLAYER OF A LOW SATURATION MAGNETIZATION

[75] Inventors: Brij Bihari Lal, San Jose; Sudhir S. Malhotra, Fremont; Michael A. Russak, Los Gatos, all of Calif.

[73] Assignee: HMT Technology Corporation, Fremont, Calif.

[21] Appl. No.: 08/825,471

[22] Filed: Mar. 28, 1997

Related U.S. Application Data

[63] Continuation-in-part of application No. 08/634,895, Apr. 26, 1996.

[51] Int. Cl.$^6$ ........................................................ G11B 5/66
[52] U.S. Cl. .................. 428/216; 428/336; 428/668; 428/694 TM; 428/694 TS; 428/65.7; 428/900; 204/192.2
[58] Field of Search ...................... 428/216, 336, 428/668, 694 TM, 694 TS, 900, 65.7; 204/192.2

[56] References Cited

U.S. PATENT DOCUMENTS

| | | | |
|---|---|---|---|
| 3,239,335 | 3/1966 | Carlson et al. | 75/126 |
| 4,722,869 | 2/1988 | Honda et al. | 428/611 |
| 4,743,491 | 5/1988 | Asada et al. | 428/213 |
| 4,833,020 | 5/1989 | Shiroishi et al. | 428/336 |
| 5,024,903 | 6/1991 | Mizukami | 428/694 |
| 5,569,533 | 10/1996 | Lal et al. | 428/332 |
| 5,605,733 | 2/1997 | Ishikawa et al. | 428/65.3 |
| 5,674,637 | 10/1997 | Miyazaki et al. | 428/694 T |

OTHER PUBLICATIONS

Doerner, M.F., et al., "Composition Effects in High Density CoPtCr Media," *IEEE Trans. Mag.* 29(6):3667 Nov. (1993).

Fang, L.L.Z., and Lambeth, D.N., "New High Coercivity Cobalt Alloy Thin Film Medium Structure for Longitudinal Recording," *Appl. Phys. Lett.* 65(24):3187 Dec. (1994).

Lee, L.-L., et al., "Effects of Cr Intermediate Layers on CoCrPt Thin Film Media on NiAl Underlayers," *IEEE Trans. Mag.* 31(6):2728 Nov. (1995).

Parker, M.A., et al., "Crystallographic Structure of CoPtCr/CrV Thin Films as Revealed by Cross–Section TEM and X–Ray Pole–Figure Analysis and its Relevance to Magnetic Properties," *J. Appl. Phys.* 73(10):5560 May (1993).

*Primary Examiner*—Stevan A. Resan
*Attorney, Agent, or Firm*—Judy M. Mohr; Dehlinger & Associates

[57] ABSTRACT

An improvement in a magnetic recording medium having an underlayer and a magnetic layer is described. The improvement, effective to increase the coercivity of the medium, includes deposition of an interlayer between the underlayer and the magnetic recording layer. The interlayer is deposited to a thickness of between 10–60 Å and is composed of an CoCr-based alloy having a defined saturation magnetization.

18 Claims, 10 Drawing Sheets

MAGNETIC RECORDING MEDIUM HAVING A COCR ALLOY INTERLAYER OF A LOW SATURATION MAGNETIZATION

This is a continuation-in-part application of copending U.S. application Ser. No. 08/634,895 for "MAGNETIC RECORDING MEDIUM WITH A CRRU UNDERLAYER", filed Apr. 26, 1996 pending.

FIELD OF THE INVENTION

The present invention relates to a magnetic recording medium having an interlayer deposited between an underlayer and a magnetic recording layer.

REFERENCES

Doerner, M. F., et al., *IEEE Trans. Mag.,* 29(6):3667 (1993).

Fang, L. L. Z., and Lambeth, D. N., *Appl. Phys. Lett.* 65(24):3137 (1994).

Futamoto, M. et al., U.S. Pat. No. 4,722,869, issued Nov. 17, 1987.

Hata, H., et al., *IEEE Trans. Mag.,* 26(5):2709(1990).

Jorgensen, F., *THE COMPLETE HANDBOOK OF MAGNETIC RECORDING*, TAB Books, Blue Ridge Summit, Pa. (1988).

Laughlin, D. E., et al., *IEEE Trans. Mag.,* 27(6):4713 (1991).

Lee, L.-L., et al., *IEEE Trans. Mag.,* 31(6):2728 (1995).

Mee, C. D. and Daniel, E. D., *MAGNETIC RECORDING VOLUME I: TECHNOLOGY*, McGraw-Hill Book Co., San Francisco (1987).

Parker, M. A., et al., *J. Appl. Phys.,* 73:5560 (1993).

BACKGROUND OF THE INVENTION

The magnetic properties of magnetic recording media are dependent on the crystallographic texture and microstructure of the magnetic recording layer, which, in turn, are influenced by the underlayers in the medium (Laughlin, et al., 1991). Longitudinal magnetic recording media for use in computer disc drives are typically formed on a rigid substrate and include an underlayer over which a magnetic recording layer is deposited. The underlayer strongly influences the crystallographic texture and microstructure of the magnetic recording layer (Fang, Lee, Laughlin, et al., 1991).

A typical underlayer in such media is composed of chromium which provides a crystalline template texture with lattice matching for epitaxial deposition of some conventional cobalt-based alloys used in forming the overlying magnetic layer. In this way, the desired c-axis orientation of hexagonal-close packed phase of cobalt alloys can be achieved, which induces in-plane magnetization, desirable for longitudinal recording.

One approach to improving lattice matching between the underlayer and the magnetic layer has been to deposit underlayers composed of a chromium alloy having closer lattice matching with the overlying magnetic layer. For example, V has been added to chromium to improve its lattice match with CoCrPt (Parker, et al., 1993).

Another approach has been to deposit of an underlayer formed of an element other than chromium. For example, an underlayer of Ge has been described for use with a CoCr magnetic alloy for perpendicular magnetic recording (Futamoto, et al., 1987).

Another approach to enhancing magnetic properties by improving the lattice matching between the underlayer and the magnetic layer is by controlling the sputter deposition conditions of the underlayer. For example, chromium underlayers deposited at low substrate temperature and high deposition pressure form thick, columnar structures with voided boundaries for reduced exchange coupling and reduced noise (Doerner, et al., 1993).

More recently, deposition of an interlayer between the magnetic layer and the underlayer has been suggested (Fang, Lee). Lee describes the use of an NiAl underlayer for inducing better in-plane c-axis texture in CoCrPt films. A Cr intermediate layer is deposited between the NiAl underlayer and the CoCrPt layer to modify the interface structure between the two layers without disrupting the existing epitaxial relation between the NiAl and CoCrPt layers.

Fang describes a medium having an intermediate layer of Co or CoCrTa (84/13/3) deposited between a chromium underlayer and a CoCrPt magnetic layer. The intermediate layer in Fang also serves as a magnetic recording layer, since cobalt alloys containing chromium in this range have an appreciable saturation magnetization (Doerner, et al., 1993).

SUMMARY OF THE INVENTION

Accordingly, it is an object of the invention to provide a magnetic recording medium having improved magnetic recording properties by including in the medium an interlayer deposited between the underlayer and the magnetic layer.

It is an object of the present invention to provide a magnetic medium having an interlayer, deposited between the underlayer and the magnetic layer, which functions to improve lattice matching with the magnetic layer, thereby enhancing magnetic recording properties, in particular coercivity.

In one aspect, the invention includes an improvement in a magnetic recording medium formed on a rigid substrate and having an underlayer and a magnetic recording layer deposited on the substrate. The improvement, which is effective to increase the coercivity of the medium, comprises an interlayer disposed between the underlayer and the magnetic recording layer, where the interlayer (i) is composed of a CoCr-based alloy having a saturation magnetization of between 10–50 emu/cm$^3$ and (ii) has a thickness of between 10–60 Å and the CoCr-based alloy is homogeneous through the interlayer thickness.

In one embodiment, the interlayer and the magnetic layer are formed from a CoCr-based alloy having the same elemental constituents in different proportions. For example, in one embodiment, the interlayer is composed of an alloy containing 50–60 atomic percent cobalt, 3–10 atomic percent nickel, 24–50 atomic percent chromium and 1–10 atomic percent tantalum and the magnetic layer is composed of an alloy containing 60–80 atomic percent cobalt, 3–10 atomic percent nickel, 10–20 atomic percent chromium and 2–10 atomic percent tantalum.

The underlayer in the medium, in one embodiment, is composed of chromium. In another embodiment, the underlayer is composed of an alloy containing between about 2–20% ruthenium and remainder chromium, more preferably between 2–10% ruthenium and remainder chromium.

In another aspect, the invention includes an improvement in a method of producing a magnetic recording medium by sputtering onto a substrate an underlayer and a magnetic thin-film layer. The improvement includes depositing by sputter deposition an interlayer between the underlayer and the magnetic layer, where the interlayer (i) is composed of a CoCr-based alloy having a saturation magnetization of between 10–50 emu/cm$^3$ and (ii) has a thickness of between 10–60 Å and the CoCr-based alloy is homogeneous through the interlayer thickness.

These and other objects and features of the invention will be more fully appreciated when the following detailed description of the invention is read in conjunction with the accompanying drawings.

DETAILED DESCRIPTION OF THE INVENTION

I. Thin-Film Medium

Figure 1:
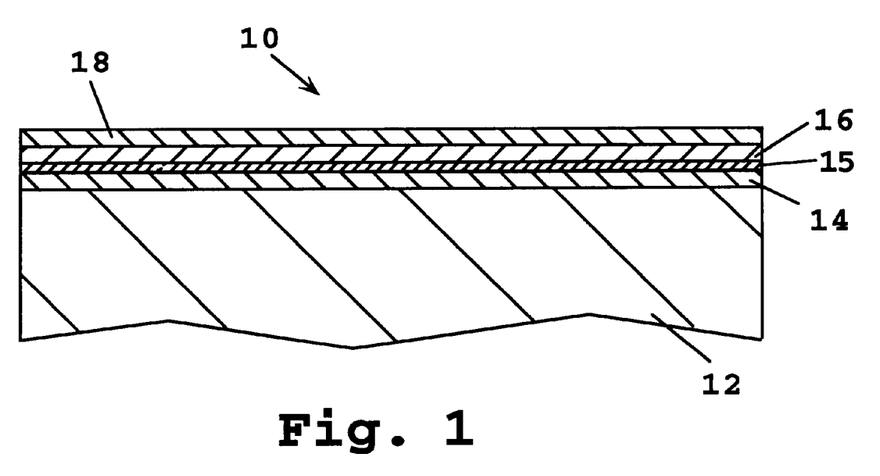
FIG. 1 is a cross-sectional view of a thin-film magnetic recording medium prepared in accordance with the present invention.

FIG. 1 shows in cross-sectional view, a fragmentary portion of a thin-film medium 10 formed in accordance with the present invention. The medium generally includes a rigid substrate 12, and forming successive thin-film layers over the substrate, an underlayer 14, an interlayer 15, a magnetic thin-film layer 16, and a protective, wear-resistant overcoat 18.

The substrate may be a textured substrate, such as a conventional surface-coated, textured aluminum substrate of the type used commonly for digital recording medium, or a textured glass or ceramic substrate. Typically, aluminum substrates are first plated with a selected alloy plating, such as a nickel/phosphorus plating, to achieve a requisite surface hardness, with the thickness of the plating being about 300–700 micro-inches.

Conventional size substrates have outer diameters of 130 mm (5.25 inches), 95 mm (3.5 inches) or 65 mm (2.5 inches) with corresponding inner diameters of 40 mm (1.57 inches), 25 mm (0.98 inches) and 10 mm (0.79 inches), respectively.

Underlayer 14 is preferably formed of a chromium-based alloy, which, as used herein includes chromium (Cr) and alloys containing greater than about 80% chromium. Exemplary alloys include CrV, CrSi, CrGd and CrRu. In a preferred embodiment, the underlayer is a CrRu alloy containing between about 2–20% ruthenium, more preferably 2–10% ruthenium, and remainder chromium. Alloy percentages reported herein are atomic weight percentages, for example, a 90/10 CrRu alloy refers to an alloy of 90 atomic percent chromium and 10 atomic percent ruthenium.

It will be appreciated that the underlayer, when formed of chromium or of a binary alloy such as CrRu, may also contain minor amounts of other elements. For example, any of the following elements when added in amounts of less than about 5%, preferably less than about 3%, to the CrRu alloy may be suitable for the underlayer of the invention: Si, Cu, Pt, Al, Mo, Ta, Ge, B, Ni, W, V, Hf, No, Zr, Ti, Os, Pd, Sb and C.

The underlayer has a thickness of between about 100–3,000 Å, more preferably between about 150–1,000 Å, most preferably between 200–800 Å.

With continuing reference to FIG. 1, and according to an important aspect of the invention, the medium includes an interlayer, such as interlayer 15, which is deposited directly on the underlayer. The interlayer is composed of a cobalt/chromium-based (CoCr-based) alloy, which, as used herein refers to an alloy containing at least about 24% Cr, preferably 24–50% Cr, more preferably 30–50% Cr and most preferably 30–40% Cr and at least about 50% cobalt. Importantly, the CoCr-based alloy forming the interlayer has a saturation magnetization of between about 10–50 memu/cm$^2$. Saturation magnetization in this range is considerably lower than that used for formation of the magnetic recording layer in a magnetic recording medium. For example, the saturation magnetization in emu/cm$^2$ of some common magnetic materials are cobalt, 1430; nickel 483, iron 1710; CrO$_2$, 480 (Mee and Daniel, (1987).

Saturation magnetization of magnetic materials can be found in the literature, for example in MAGNETIC RECORDING VOLUME I: TECHNOLOGY by Mee and Daniel (1987) or in the paper by Doerner (1993), which reports the saturation magnetization of CoPtCr as a function of Cr concentration. Saturation magnetization values of magnetic materials can also be determined experimentally from the hysteresis loop obtained using a vibrating sample magnetometer, as described, for example in Jorgensen, et al. (1990).

In experiments conducted in support of the present invention, as discussed below, magnetic media were prepared with an interlayer composed of CoCrTa (60/36/4) or CoNiCrTa (53/8/36/3). These materials have a relatively high chromium content and therefore, a saturation magnetization considerably less than cobalt alloys conventionally used for magnetic recording layers.

In the present invention, a preferred CoCr-based alloy for use in forming the interlayer is a CoNiCrTa alloy containing between 50–60 atomic percent cobalt, 5–10 atomic percent nickel, 24–50 atomic percent chromium and 1–10 atomic percent tantalum. Another preferred alloy is CoCrTa containing between 50–70 atomic percent cobalt, 24–40 atomic percent chromium and 2–10 atomic percent tantalum.

In one embodiment of the invention, the interlayer and the magnetic layer are formed of a CoCr-based alloy having the same elemental constituents, but where those constituents are in different proportions. For example, in experiments performed in support of the invention, described below, media were formed having an interlayer of CoNiCrTa (53/8/36/3) and a magnetic recording layer of CoNiCrTa (72/8/14/6).

The alloy composition in the interlayer of the present invention is homogeneous through the thickness of the layer.

The interlayer forms a discrete layer between the underlayer and the magnetic layer and has the same alloy composition at the underlayer-interlayer boundary as at the magnetic layer-interlayer boundary. With continuing reference to FIG. 1, magnetic thin-layer film 16 is formed by sputtering onto the underlayer, a cobalt-based alloy—that is, an alloy containing at least about 50% cobalt. Preferable alloys include cobalt-based alloys containing nickel, platinum and/or tantalum. A preferred alloy is CoCrNiTa having between 70–80 atomic percent cobalt, 3–10 atomic percent nickel, 10–20 atomic percent chromium and 2–10 atomic percent tantalum. The CoCrNiTa alloy used in experiments in support of the present invention was composed of 72% Co, 8% Ni, 14% Cr and 6% Ta. Another exemplary alloy is CoCrPtTa, composed of 70–90 atomic percent cobalt, 3–15 atomic percent platinum, 2–20 atomic percent chromium and 1–10 atomic percent tantalum.

It will be appreciated that the magnetic layer may consist of two or more magnetic films separated by thin, nonmagnetic isolation layers, as has been described (Hata, et al., 1990).

Overcoat 18 is composed of a material giving wear-resistant, protective properties to the medium. Preferably, the overcoat is composed of C, Zr, $ZrO_2$, Si, SiC, or $SiO_2$, most preferably of carbon, which may include carbon produced by sputtering in an argon atmosphere containing nitrogen or hydrogen, for an overcoat containing hydrogen and/or nitrogen. The overcoat thickness is preferably between about 100–400 Å.

After sputter deposition of the overcoat, the medium is typically coated with a lubricant, such as a convention, commercially available perfluoropolyether lubricant.

II. Method of Producing the Medium

Figure 2:
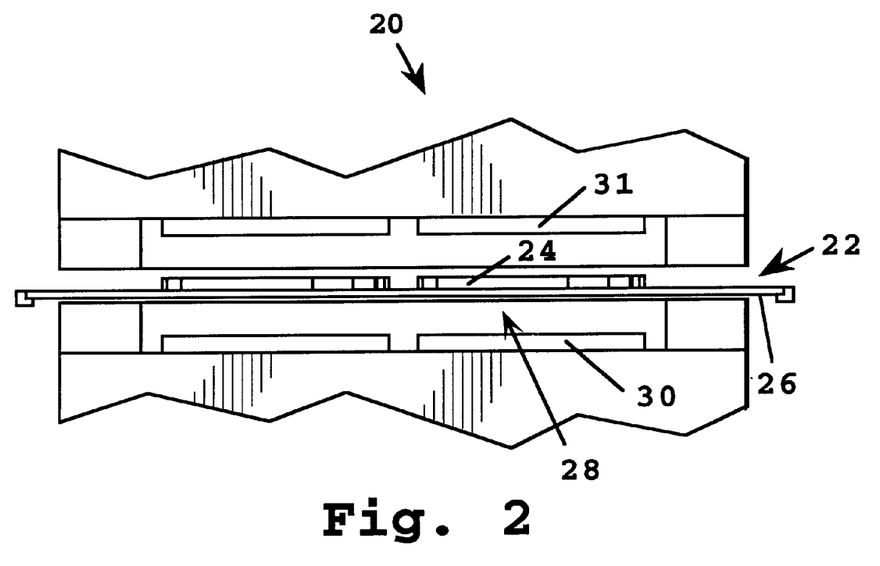
FIG. 2 is a schematic view of a sputtering apparatus used in producing the thin-film medium of the invention.

FIG. 2 shows, in schematic view, a portion of a sputtering apparatus 20 which is used, in the method of the invention, for producing the thin-film medium described in Section I. The apparatus includes a vacuum chamber 22 having at least five stations at which sputtering or heating operations occur. A heating station (not shown) at the upstream end of the chamber has a plurality of infrared lights which are arrayed for heating both sides of a substrate, such as substrate 24, carried through the station in the chamber on an aluminum disc holder 26.

Just downstream of the heating station is a first sputtering station 28 at which an underlayer is formed on a substrate, in a manner to be described. The station includes a pair of targets, such as targets 30, 31, effective to sputter onto opposite sides of substrate 24. The targets in station 28 are composed of a material listed above for use in forming the underlayer.

A second sputtering station (not shown) downstream of chamber 28 is designed for sputtering an interlayer directly onto the underlayer. The station includes a pair of sputtering targets for sputtering onto opposite sides of the underlayer-coated substrate.

A third sputtering station (not shown) downstream from the second sputtering chamber is designed for sputtering a magnetic film onto the interlayer. The station includes a pair of sputtering targets for sputtering the magnetic film alloy onto the substrate, after formation of the interlayer on the substrate. The targets in this station are formed of a Co-based alloy, formed and shaped for use as a sputtering target by conventional metallurgical methods.

Also included in the apparatus is a DC power source (not shown) for placing a selected voltage potential between the sputtering targets, such as targets 30, 31, and substrate 24. More specifically, the power source is designed to place a DC negative bias on the substrate of −50 to −600 volts, measured with respect to target, in both chamber 28, where the underlayer sputtering occurs, and the downstream chambers where interlayer and magnetic thin-film layer sputtering occurs. In some of the experiments described below and performed in support of the present invention, a bias was placed on the substrate during sputtering of the magnetic recording layer.

The carbon overcoat in the medium is produced by sputtering from a graphite target in a sputtering stations further downstream (not shown) in the apparatus.

The basic sputtering apparatus is preferably a commercial system, such as in available from Varian/Intevac (Santa Clara, Calif.), Circuits Processing Apparatus (Fremont, Calif.), ULVAC (Japan), Leybald Heraeus (Germany), VACTEC (Boulder, Colo.), Anelva (Japan) or Materials Research Corporation (Albany, N.Y.). These systems are double-sided, in-line, high-throughput machines having two interlocking systems, for loading and unloading.

In operation, the sputtering chamber is evacuated to pressure of about $10^{-7}$ Torr, and argon gas is introduced into the chamber to a final sputtering pressure of 5–20 mTorr. A preferred argon gas pressure is 6 mTorr.

The substrate is heated in the heating station to a selected temperature before advancing into the sputtering chambers. The heating conditions in the apparatus are preferably adjusted to achieve a substrate temperature of between about 150° C. and 300° C., and preferably about 250° C.

The heated substrate is moved into the first sputtering chamber, and the underlayer is sputtered onto the disc surface. In the experiments performed in support of the invention, media were prepared having an underlayer of CrRu (90/10) or of chromium, deposited to a selected thickness of typically about 400 Å.

The underlayer-coated substrate is shuttled downstream to a second sputtering chamber for deposition of the interlayer. The interlayer is formed by sputtering from a target composed of a cobalt-based alloy, such as those described above and is deposited to a thickness of between about 10–60 Å, more preferably between 10–40 Å.

The coated substrate is shuttled downstream to another sputtering chamber for deposition of the magnetic recording layer. The magnetic recording layer is formed by sputtering from a target composed of a cobalt-based alloy, such as those described above and is deposited to a thickness of between about 100–800 Å.

After deposition of the magnetic recording layer, the protective overcoat is deposited in another sputtering chamber.

III. Media Properties

The magnetic recording properties of media formed in accordance with the present invention to have an interlayer deposited between the underlayer and the magnetic recording layer are described in this section, which is divided into sections A and B. Section A describes the properties of media having an underlayer of CrRu (90/10) and section B describes the properties of media having an underlayer of Cr.

A. Media Having a CrRu (90/10) Underlayer

In experiments performed in support of the invention, magnetic recording media were prepared as described in Example 1 to have a CrRu (90/10) underlayer having a thickness of typically about 400 Å, an interlayer of either CoCrTa (60/36/4) or of CoNiCrTa (53/8/36/3), as indicated, a magnetic recording layer of CoNiCrTa (72/8/14/6) having a thickness of typically about 400 Å and a protective carbon overcoat. Static magnetic properties were determined by vibrating sample magnetometry. Magnetic recording testing was carried out on a Guzik Model RWA 1601, using an inductive write head and a magnetoresistive playback head (shield-to-shield gap=0.7 μm, track width=3.5 μm). The head flying height was 2.2 microinches with a linear disc speed of 8 meter/second. The medium transition noise was measured by integrating the noise spectrum over a bandwidth of 40 MHz and subtracting off the electronic and spindle noise. The SNR was obtained from the above spectrum signal divided by the medium transition noise.

The static magnetic properties for media having a 400 Å CrRu underlayer, a 20 Å CoNiCrTa (53/8/36/3) interlayer and CoNiCrTa (72/8/14/6) magnetic layer are shown in Table 1A. For comparison, the static magnetic properties of a similar medium composed of the same layers but lacking an interlayer are shown in Table 1B. Coercivity (Hc), squareness ratio (SR), coercive squareness (S*), orientation ratio (OR) and magnetic remanence thickness product ($M_r t$) were measured from the VSM curves conventionally.

TABLE 1A

Static Magnetic Properties for Media Having an Interlayer and a CrRu Underlayer*

| | VSM Data | | |
|---|---|---|---|
| Coercivity (Oe) | SR | S* | $M_r t$ (memu/cm2) |
| 2637 | 0.86 | 0.84 | 1.13 |
| 2791 | 0.88 | 0.84 | 0.95 |
| 2958 | 0.91 | 0.80 | 0.76 |
| 3085 | 0.89 | 0.80 | 0.60 |
| 3023 | 0.91 | 0.69 | 0.52 |
| 3077 | 0.79 | 0.82 | 0.40 |

*Media composed of 400 Å CrRu (90/10) underlayer, 20 Å CoNiCrTa (53/8/36/3) interlayer and CoNiCrTa (72/8/14/6) magnetic layer.

TABLE 1B

Static Magnetic Properties for Media Like Those in Table 1A but with No Interlayer*

| | VSM Data | | |
|---|---|---|---|
| Coercivity (Oe) | SR | S* | Mrt (memu/cm2) |
| 2579 | 0.90 | 0.83 | 1.19 |
| 2636 | 0.87 | 0.73 | 0.97 |
| 2782 | 0.88 | 0.83 | 0.79 |
| 2723 | 0.88 | 0.77 | 0.61 |
| 2505 | 0.78 | 0.69 | 0.46 |
| 2106 | 0.71 | 0.86 | 0.37 |

*Media composed of 400 Å CrRu (90/10) underlayer and CoNiCrTa (72/8/14/6) magnetic layer.

By comparing the data presented in Tables 1A and 1B, it can be seen that the interlayer is effective to increase media coercivity over the range of Mrt tested. At an Mrt of about 1.1 memu/cm2, the interlayer is effective to increase coercivity by about 2%. At an Mrt of about 0.4, the interlayer is effective to increase coercivity by about 46%. Importantly, the increase in coercivity is achieved with little change in squareness ratio (SR) or coercive squareness (S*).

Tables 2A and 2B show the static magnetic properties for media described above with respect to Tables 1A and 1B, except in Table 2A where the interlayer is composed of CoCrTa (60/36/4) (Table 2A). The media in Table 2B have no interlayer.

TABLE 2A

Static Magnetic Properties for Media Having a CoCrTa Interlayer and CrRu Underlayer*

| | VSM Data | | | |
|---|---|---|---|---|
| Coercivity (Oe) | SR | S* | OR | Mrt (Gauss-μm2) |
| 2676 | 0.79 | 0.77 | 1.5 | 103 |
| 2786 | 0.83 | 0.82 | 1.4 | 88 |
| 2821 | 0.81 | 0.73 | 1.5 | 84 |
| 2844 | 0.80 | 0.79 | 1.5 | 66 |
| 2681 | 0.78 | 0.78 | 1.5 | 52 |

*Media composed of 400 Å CrRu (90/10) underlayer, 18 Å CoCrTa (60/36/4) interlayer and CoNiCrTa (72/8/14/6) magnetic layer.

TABLE 2B

Static Magnetic Properties for Media like Those of Table 2A but with No Interlayer*

| | VSM Data | | | |
|---|---|---|---|---|
| Coercivity (Oe) | SR | S* | OR | Mrt (Gauss-μm2) |
| 2480 | 0.86 | 0.75 | 1.5 | 113 |
| 2516 | 0.89 | 0.75 | 1.5 | 97 |
| 2493 | 0.86 | — | 1.5 | 85 |
| 2218 | 0.78 | 0.64 | 1.5 | 64 |
| 1894 | 0.74 | 0.72 | 1.5 | 50 |

*Media composed of 400 Å CrRu (90/10) underlayer and CoNiCrTa (72/8/14/6) magnetic layer.

As seen by comparing Tables 2A and 2B, the CoCrTa interlayer is effective to significantly increase coercivity, with little change in SR, S* and OR (orientation ratio).

Tables 3A and 3B compare parametrics for media prepared as described above with respect to Tables 1A and 1B. As seen, media having an interlayer deposited between the underlayer and the magnetic recording layer have an improved coercivity over the range of Mrt (0.8–0.4 memu/cm2) tested. Improvements in high frequency signal amplitude (HF), resolution (RES), overwrite (OW) and pulse-width (PW-50) are also achieved.

TABLE 3A

Parametrics for Media Having a CrRu Underlayer and a CoNiCrTa Interlayer*

| Mrt | | ID: R = 0.822" (HF: 22.09 MHz) | | | |
|---|---|---|---|---|---|
| Hc (Oe) | (memu/cm2) | HF (uV) | RES (%) | OW (-dB) | PW-50 (nS) |
| 2868 | 0.8 | 477 | 75 | 39.6 | 15.85 |
| 2731 | 0.6 | 405 | 78.9 | 37.8 | 14.97 |
| 2975 | 0.5 | 347 | 80 | 38 | 14.67 |
| 2881 | 0.4 | 275 | 81.3 | 37.2 | 14.40 |

| Mrt | | OD: R = 1.507" (HF: 37.68 MHz) | | | |
|---|---|---|---|---|---|
| Hc(Oe) | (Memu/cm2) | HF (uV) | RES (%) | OW (-dB) | PW-50 (nS) |
| 2868 | 0.8 | 512 | 77.6 | 43 | 26.60 |
| 2731 | 0.6 | 422 | 78 | 43.9 | 24.90 |
| 2975 | 0.5 | 372 | 79.6 | 45 | 24.08 |
| 2881 | 0.4 | 296 | 79.9 | 45 | 23.63 |

*Media composed of 400 Å CrRu (90/10) underlayer, 20 Å CoNiCrTa (53/8/36/3) interlayer and CoNiCrTa (72/8/14/6) magnetic layer.

TABLE 3B

Parametrics for Media Similar to Media in
Table 3A, but with No Interlayer*

| | Mrt | ID: R= 0.822" (HF: 22.09 MHz) | | | |
|---|---|---|---|---|---|
| Hc(Oe) | (memu/cm2) | HF (uV) | RES (%) | OW (-dB) | PW-50 (nS) |
| 2747 | 0.8 | 471 | 73.8 | 39 | 15.80 |
| 2469 | 0.6 | 368 | 77.7 | 37.7 | 15.05 |
| 2608 | 0.5 | 340 | 79.8 | 36.9 | 14.67 |
| 2261 | 0.4 | 270 | 79.8 | 36.9 | 14.45 |

| | Mrt | OD: R = 1.507" (HF: 37.68 MHz) | | | |
|---|---|---|---|---|---|
| Hc(Oe) | (Memu/cm2) | HF (uV) | RES (%) | OW (-dB) | Pw-50 (nS) |
| 2747 | 0.8 | 519 | 77.5 | 42.4 | 26.73 |
| 2469 | 0.6 | 417 | 78.8 | 43.7 | 24.77 |
| 2608 | 0.5 | 364 | 78.9 | 44.8 | 24.18 |
| 2261 | 0.4 | 304 | 79.7 | 45.4 | 23.55 |

*Media composed of 400 Å CrRu (90/10) underlayer and a CoNiCrTa (72/8/14/6) magnetic layer.

Figure 3A:
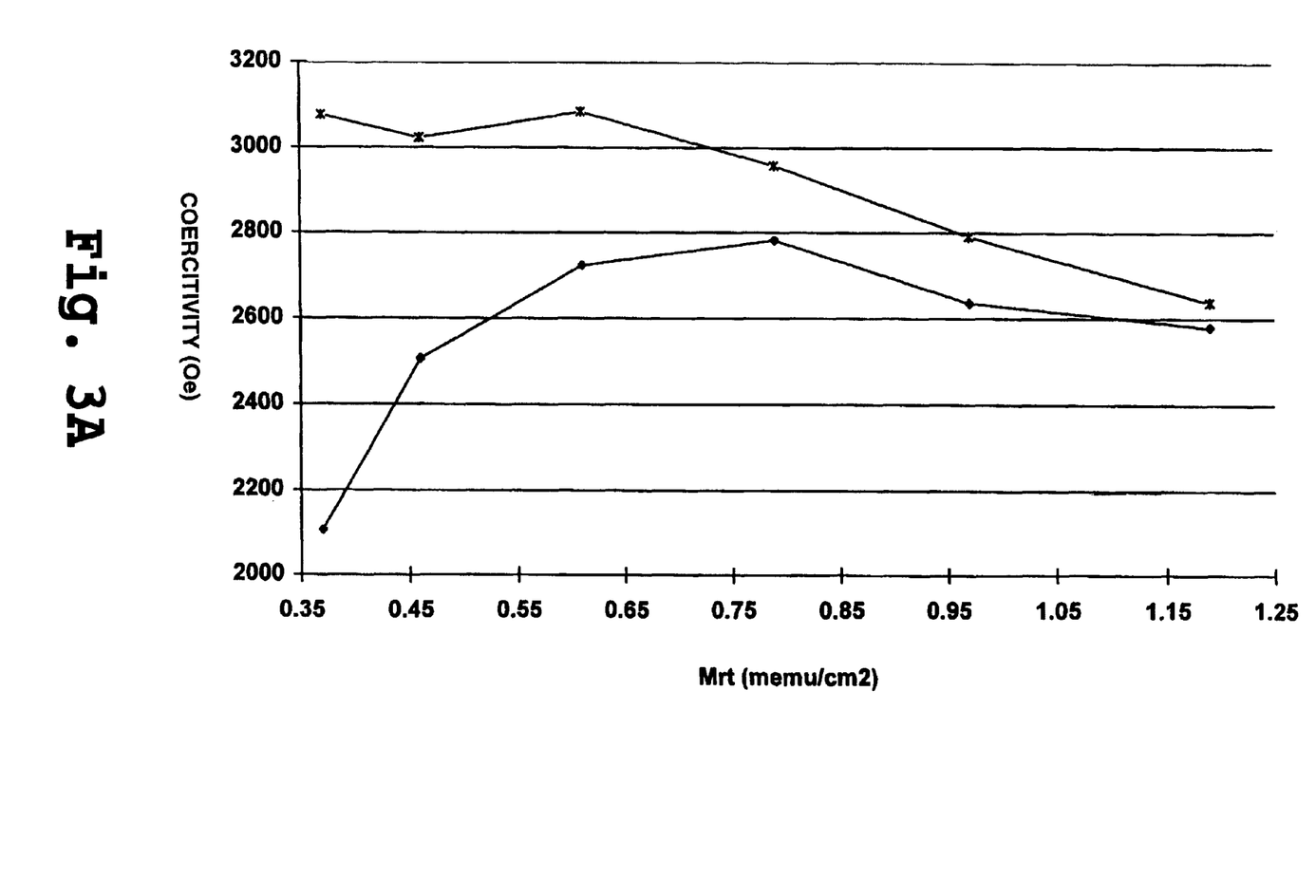
FIGS. 3A–3B are plots of coercivity, in Oe, as a function of magnetic remanence thickness product (M$_r$t), in memu/cm$^2$, for media formed with a CoNiCrTa interlayer (*, FIG. 3A) and a CoCrTa interlayer (*, FIG. 3B) and for comparative media with no interlayer (♦)

The data presented in Table 1A is shown graphically in FIG. 3A, where media coercivity, in Oe, is plotted as a function of magnetic remanence thickness product (Mrt), in memu/cm². As seen, media having a CoNiCrTa interlayer (*), relative to media lacking an interlayer (♦) have higher coercivity over the range of $M_r t$ tested, with a significant improvement at lower Mrt values, as evidenced by the 1,000 Oe increase in coercivity at an Mrt of 0.4 memu/cm2.

Figure 3B:
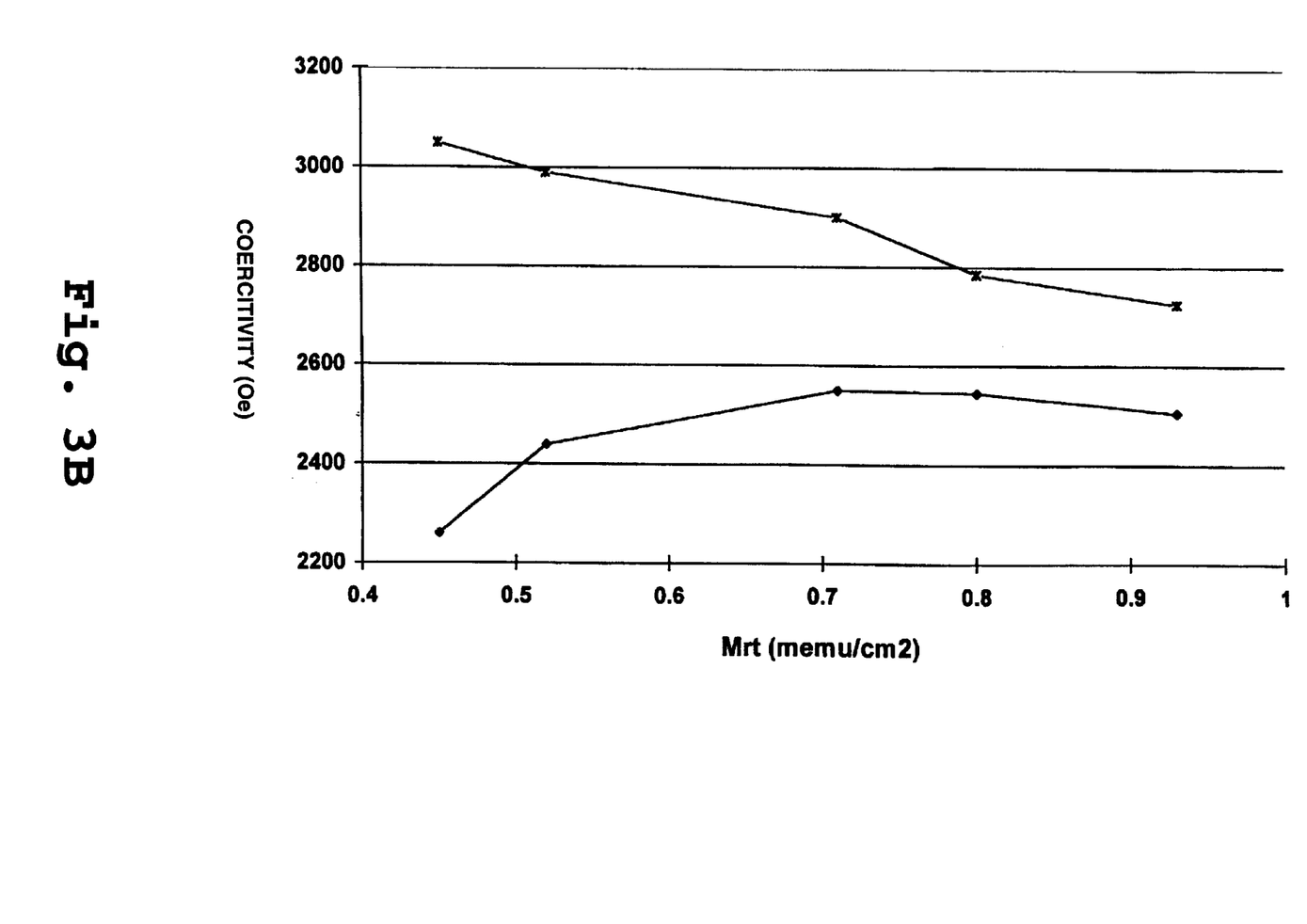

FIG. 3B is a plot similar to FIG. 3A, plotting the data presented in Tables 2A and 2B, where media having an interlayer of CoCrTa (60/36/4) deposited on the CrRu underlayer (*) are compared to similar medium which lack an interlayer (♦). As seen, the CoCrTa interlayer is effective to increase coercivity over the range of Mrt tested, with a significant improvement at lower Mrt values, as evidenced by a 13% increase at an Mrt of 0.7 memu/cm2 and a 23% increase at an Mrt of 0.52 memu/cm2.

Figure 4:
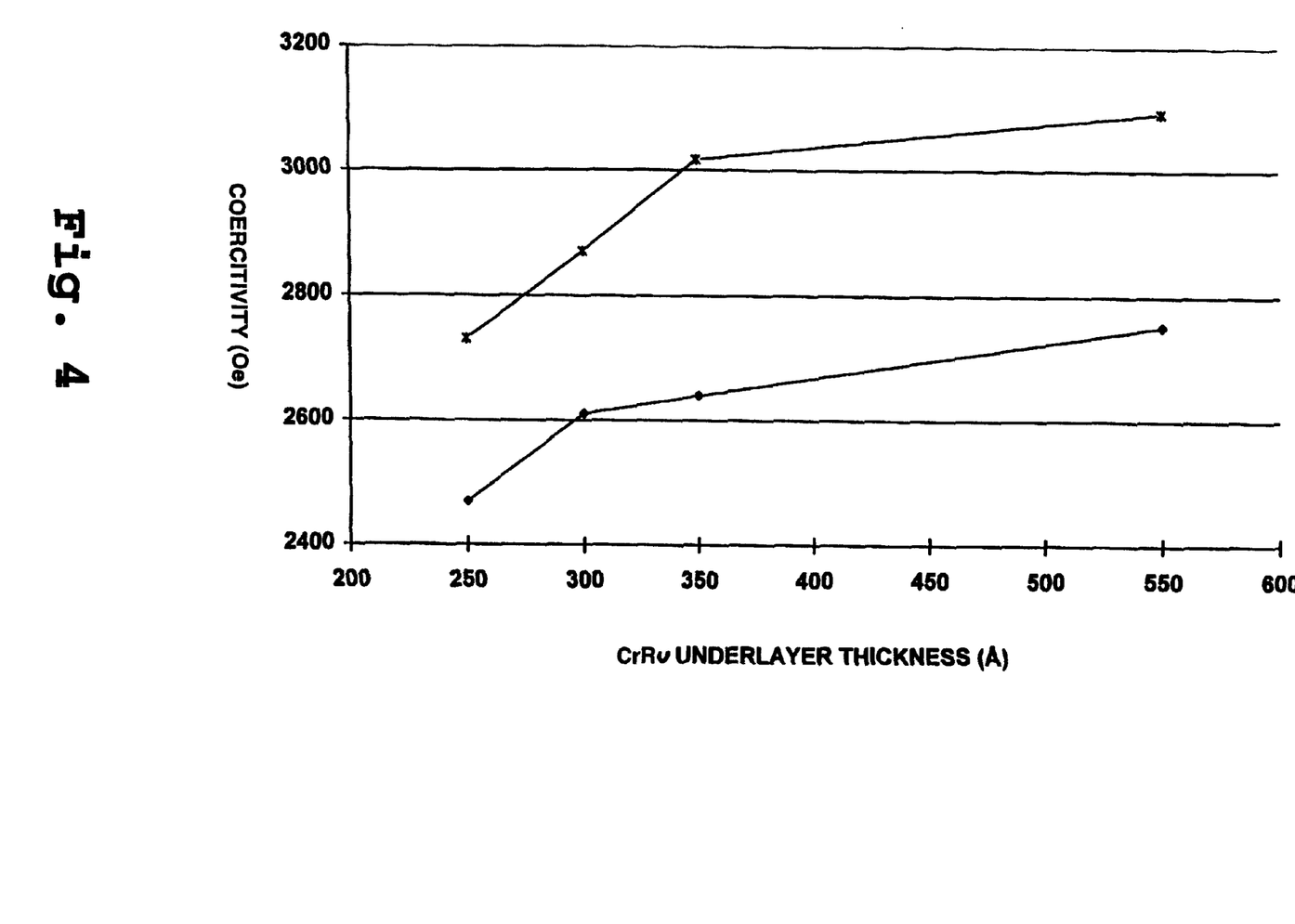
FIG. 4 is a plot of coercivity, in Oe, as a function of CrRu underlayer thickness, for media prepared with an interlayer of CoNiCrTa (*) and with no interlayer (♦)

FIG. 4 compares the relationship between coercivity and underlayer thickness, for media prepared with a CrRu underlayer and an interlayer of CoNiCrTa (*) to media lacking the interlayer (♦). As seen, media having an interlayer has a higher coercivity relative to media lacking an interlayer. This increased coercivity is maintained as the thickness of the underlayer is increased from 250 Å to 550 Å.

Figure 5A:
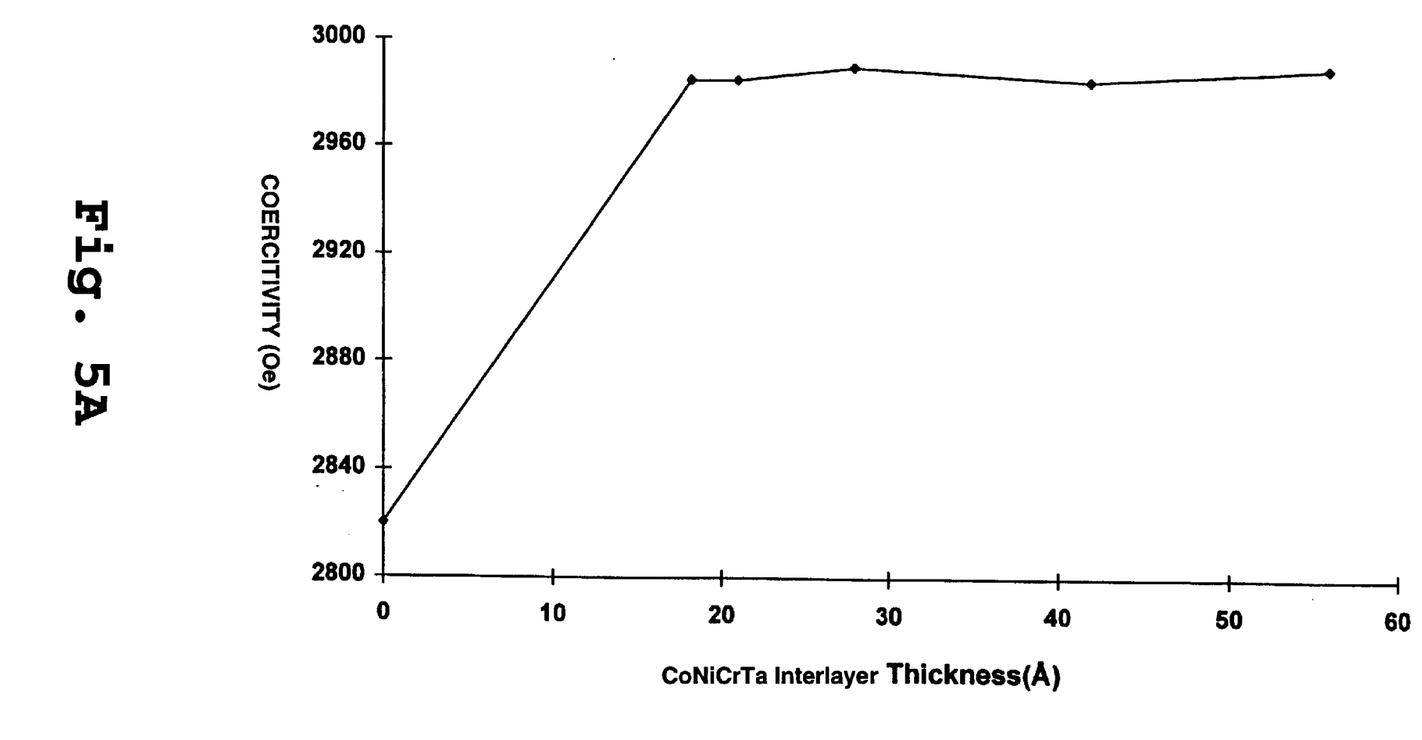
FIGS. 5A–5B are plots of coercivity, in Oe, as a function of interlayer thickness, in Å, for media prepared with a CrRu underlayer and a CoNiCrTa interlayer (FIG. 5A) or a CoCrTa interlayer (FIG. 5B)
Figure 5B:
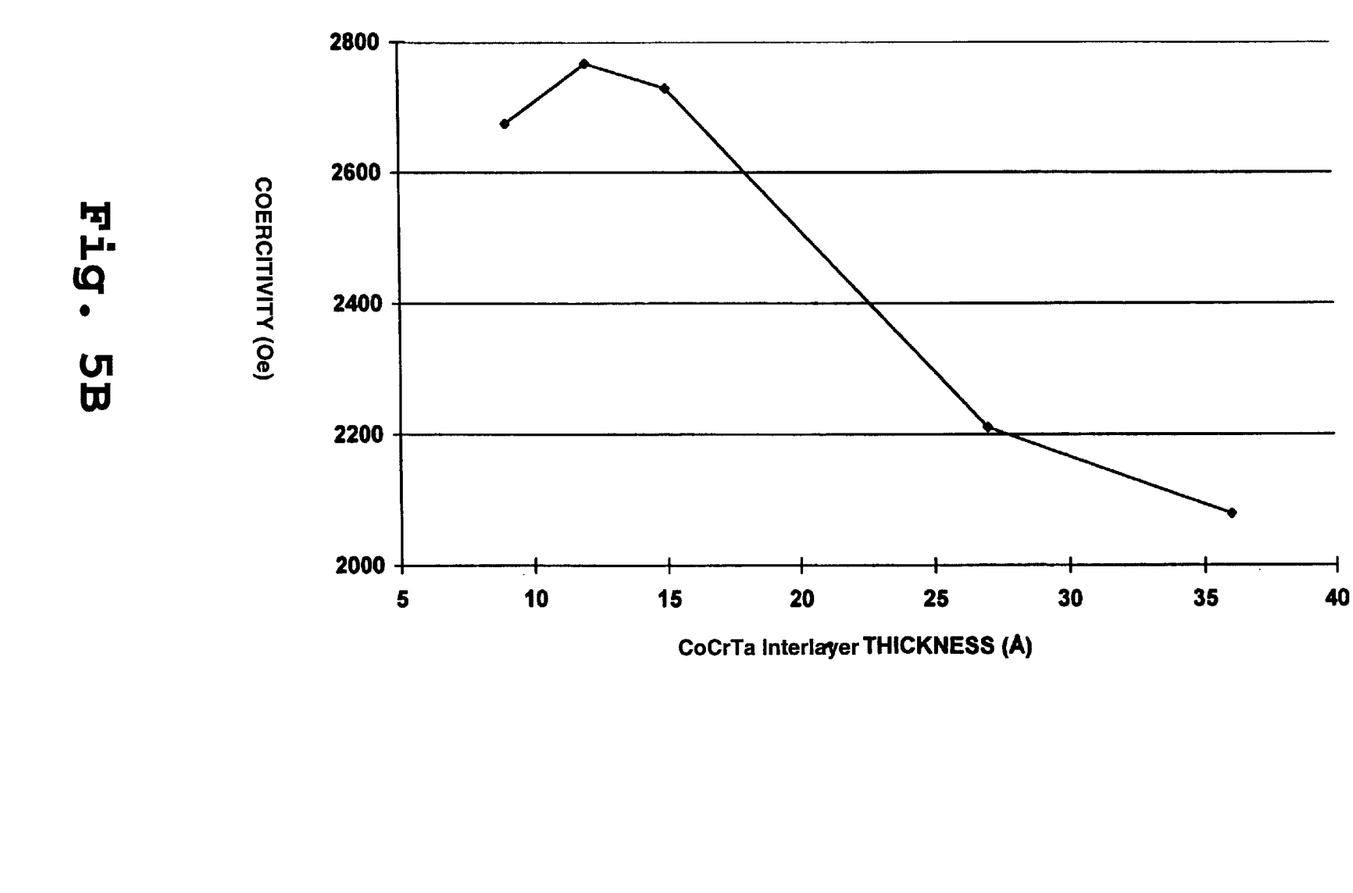

FIGS. 5A–5B are plots of coercivity as a function of interlayer thickness for media having a CrRu underlayer and a CoNiCrTa interlayer (FIG. 5A) or a CoCrTa interlayer (FIG. 5B). As seen in FIG. 5A, there is a significant increase in coercivity by addition of an interlayer, where an interlayer thickness of 18 Å achieves a 5% increase in coercivity. FIG. 5B shows that as the thickness of a CoCrTa interlayer increases beyond about 40 Å, coercivity begins to decrease. A similar result is observed for media prepared with a chromium underlayer, as will be discussed below with respect to FIG. 7.

Figure 6:
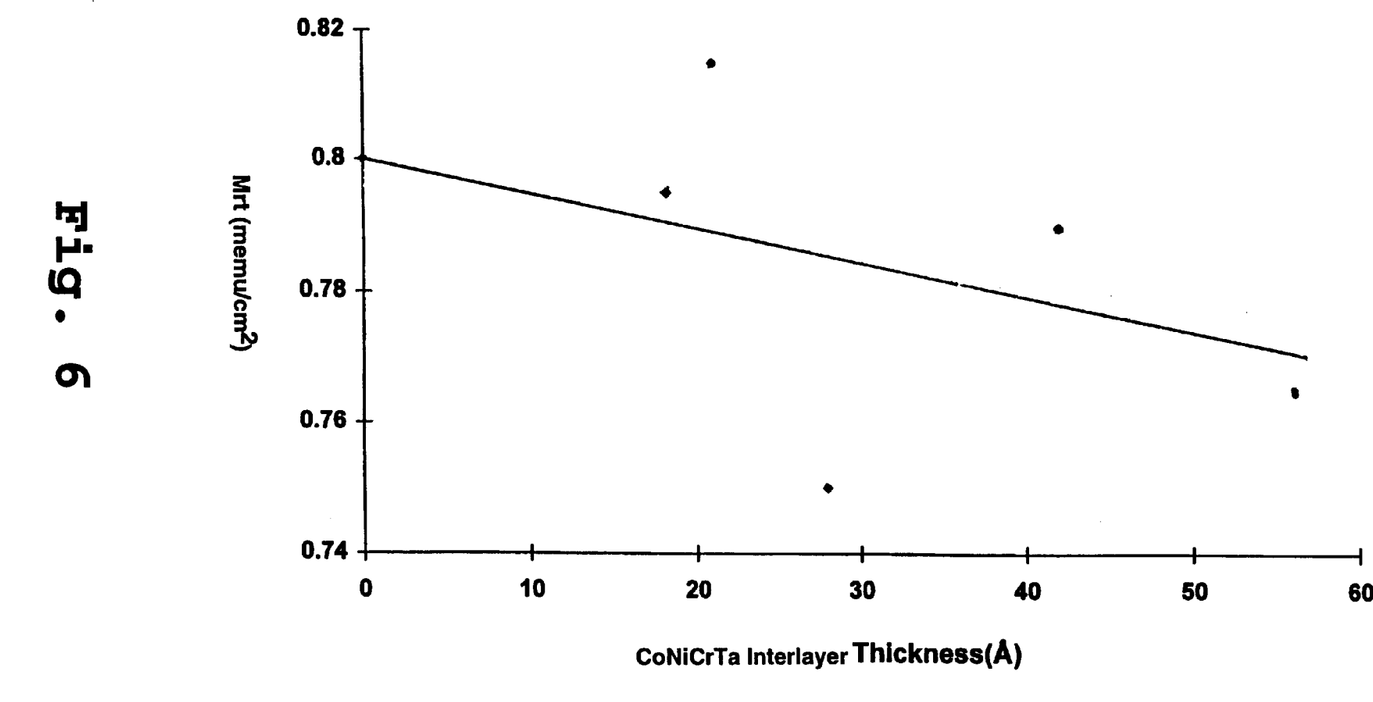
FIG. 6 is a plot of magnetic remanence thickness product (M$_r$t), in memu/cm$^2$, as a function of interlayer thickness, in Å, for media prepared with a CrRu underlayer and a CoNiCrTa interlayer.

The effect of increasing CoNiCrTa (53/8/36/3) interlayer thickness on magnetic remanence thickness product (Mrt), in memu/cm², is shown in FIG. 6. A medium, having a CrRu underlayer and a CoNiCrTa (72/8/14/6) magnetic layer, had an $M_r t$ of 0.8 memu/cm2. As the interlayer thickness increased from about 20–60 Å, the Mrt decreased only slightly to about 0.78.

B. Media Having a Cr Underlayer

In this section, magnetic recording media were prepared as detailed in Example 1 having a Cr underlayer with a thickness of typically about 400 Å, an interlayer of either CoCrTa (60/36/4) or of CoNiCrTa (53/8/36/3), as indicated, a magnetic recording layer of CoNiCrTa (74/10/12/4) having a thickness of typically about 400 Å and a protective carbon overcoat.

Table 4 summarizes the static magnetic properties of media having a chromium underlayer of 375 Å and a CoNiCrTa interlayer thickness of between 18–400 Å. The interlayer, at a thickness of 18 Å, results in a 13% improvement in media coercivity (Hc). The coercivity increases as the interlayer thickness increases to about 50 Å. At interlayer thicknesses greater than about 50 Å, the coercivity begins to decrease. Other magnetic properties, squareness ratio (SR), coercive squareness (S*) and orientation ratio (OR) remain essentially unchanged in the 18–50 Å interlayer thickness range. Beyond this thickness range, the magnetic properties diminish.

TABLE 4

Static Magnetic Properties for Magnetic Media
Having a CoNiCrTa Interlayer*

| Interlayer Thickness (Å) | Hc (Oe) | $M_r t$ (memu/cm2) | SR | S* | OR |
|---|---|---|---|---|---|
| 0 | 2128 | 2.16 | 0.91 | 0.91 | 1.53 |
| 18 | 2412 | 2.14 | 0.91 | 0.92 | 1.51 |
| 25 | 2468 | 2.09 | 0.87 | 0.90 | 1.48 |
| 40 | 2491 | 2.10 | 0.88 | 0.91 | 1.47 |
| 50 | 2453 | 1.99 | 0.83 | 0.87 | 1.45 |
| 100 | 1824 | 1.35 | 0.56 | 0.38 | 1.22 |
| 200 | 1607 | 1.21 | 0.49 | 0.32 | 1.15 |
| 400 | 1551 | 1.18 | 0.48 | 0.26 | 1.12 |

Figure 7:
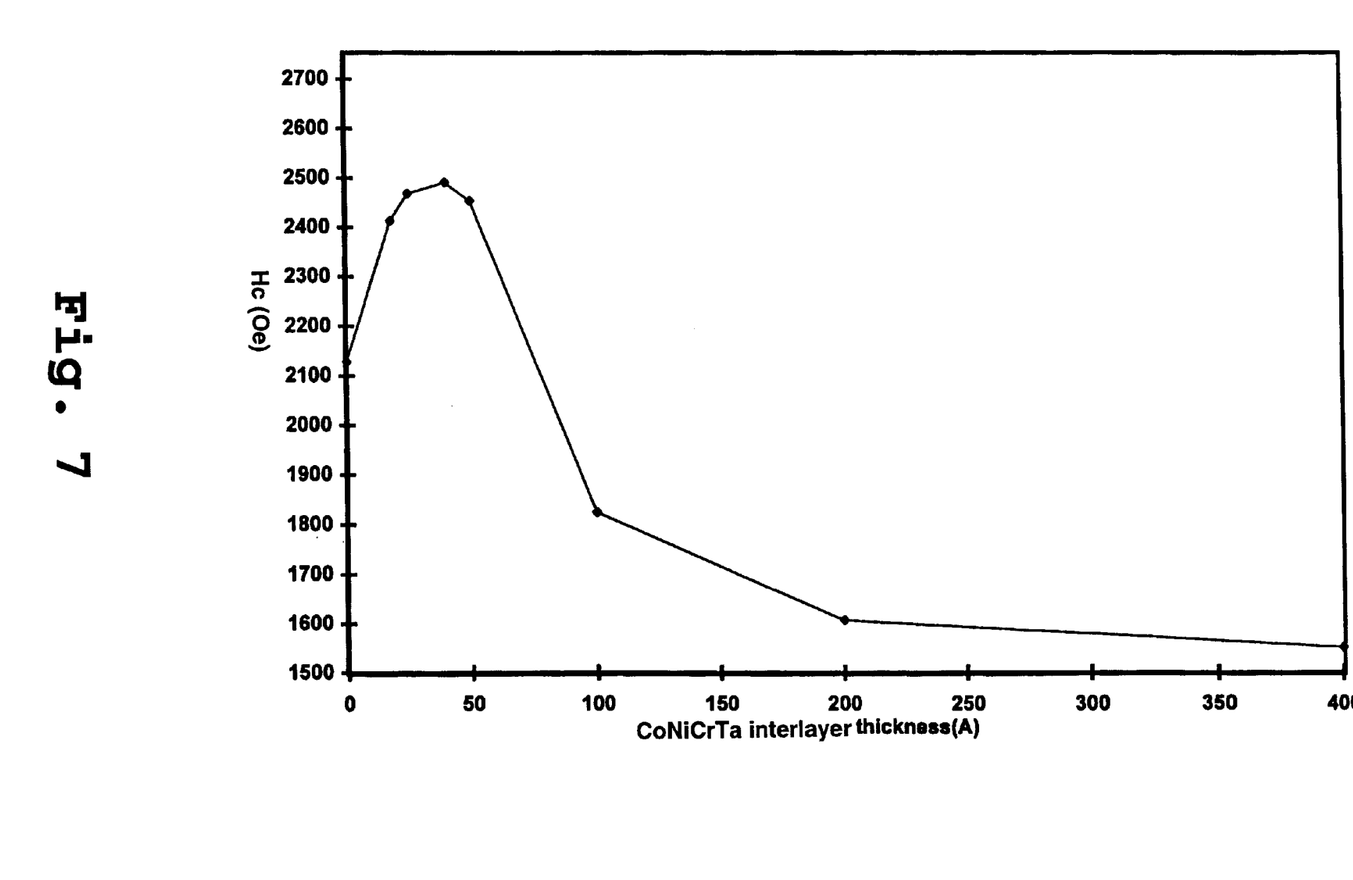
FIG. 7 is a plot of coercivity, in Oe, as a function of interlayer thickness, in Å, for media having a chromium underlayer and a CoNiCrTa interlayer.

The coercivity data presented in Table 4 is plotted in FIG. 7 against interlayer thickness. The interlayer thickness window where increased coercivity is achieved is apparent when the results are viewed graphically. An interlayer thickness of between about 10–60 Å results in improved coercivity.

Figure 8:
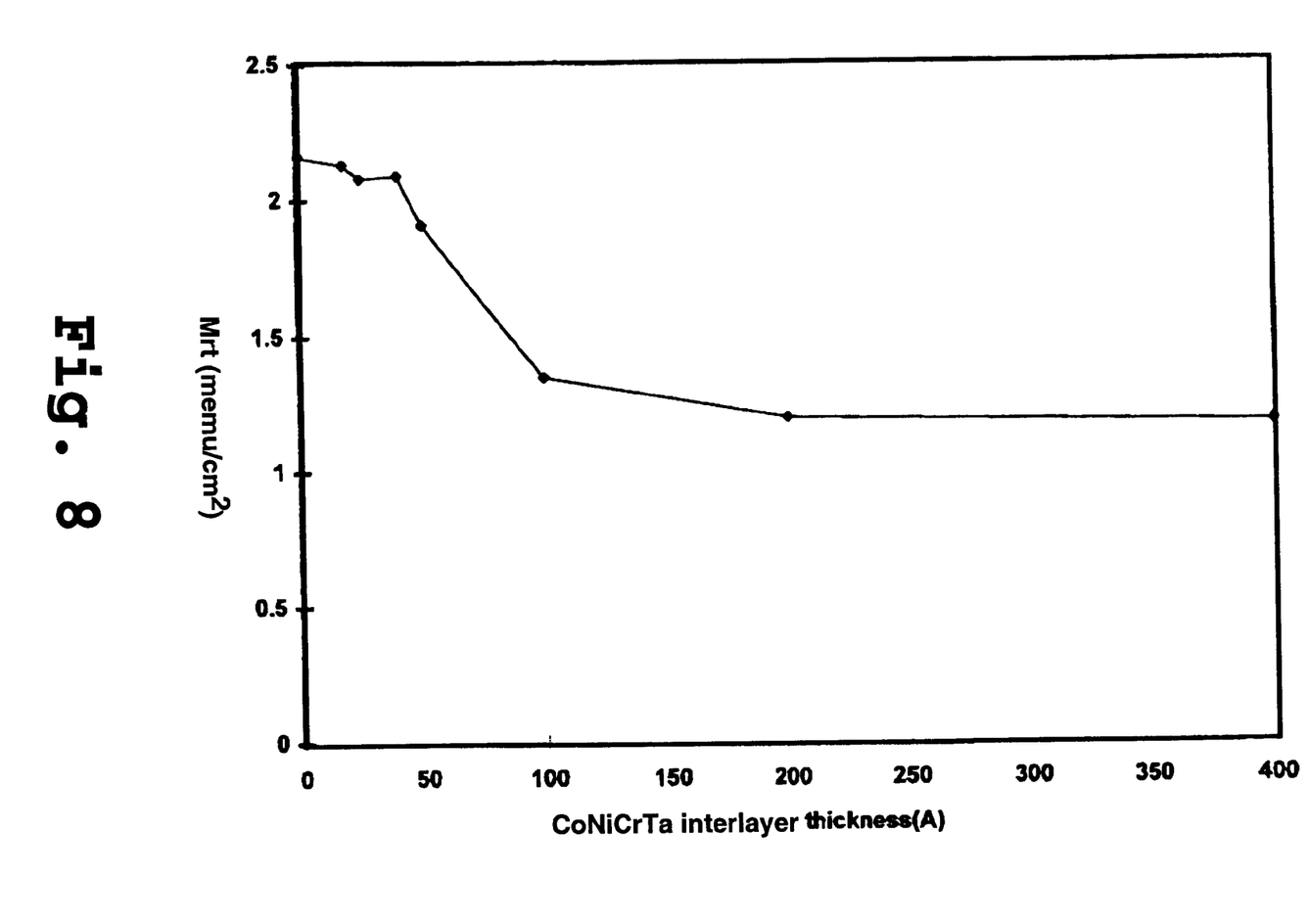
FIG. 8 is a plot of M$_r$t, in memu/cm$^2$, as a function of interlayer thickness, in Å, for media having a chromium underlayer and a CoNiCrTa interlayer.
Figure 9:
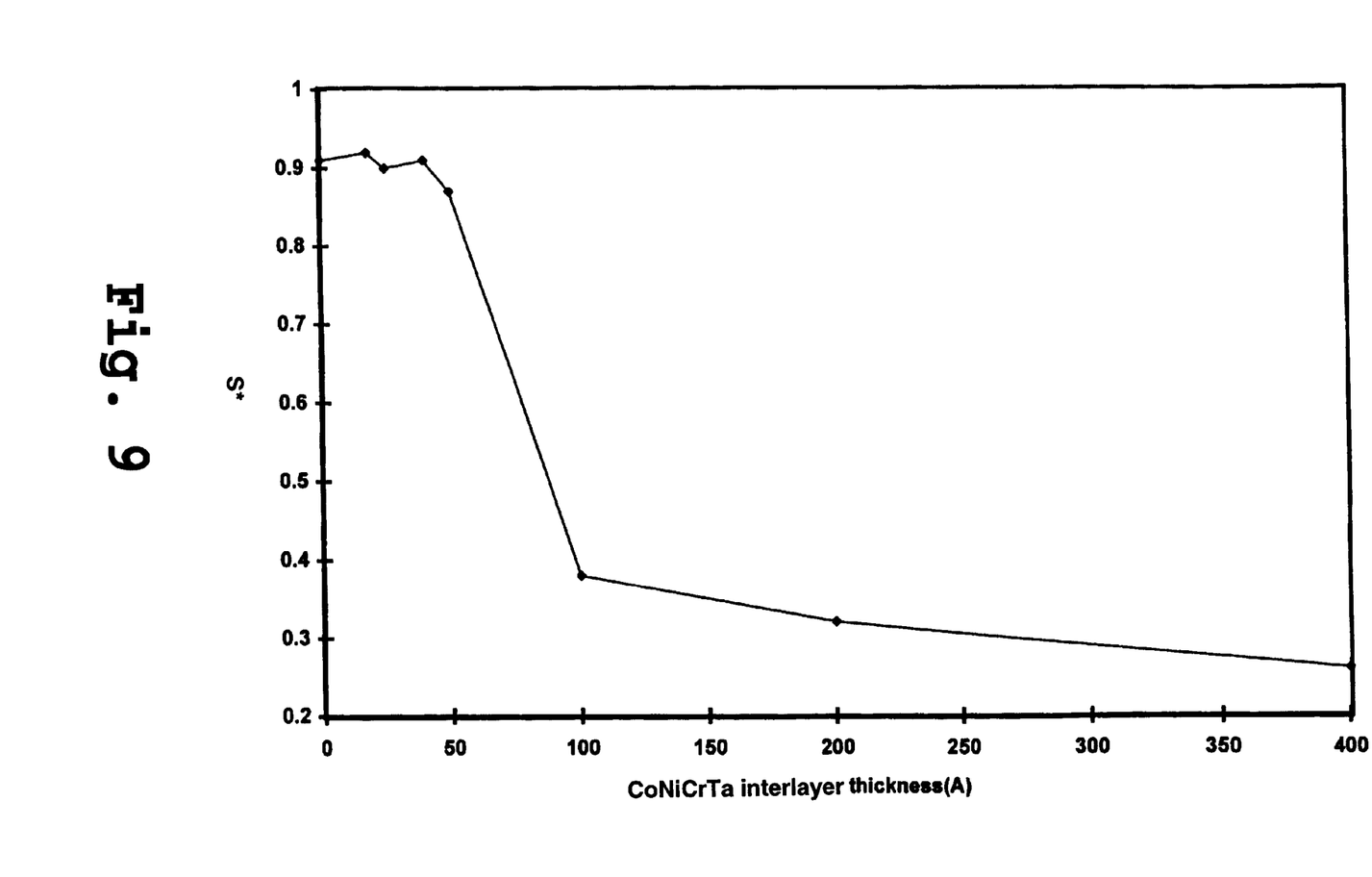
FIG. 9 is a plot of coercive squareness as a function of interlayer thickness, in Å, for media having a chromium underlayer and a CoNiCrTa interlayer.

FIGS. 8 and 9 are plots of $M_r t$ (FIG. 8) and S* (FIG. 9) as a function of interlayer thickness for the data presented in Table 4. The $M_r t$ and S* remain unchanged over the interlayer thickness range of 10–60 Å.

In a comparative experiment, a magnetic recording medium having an underlayer composed of pure Cr and an interlayer and a magnetic recording layer composed of the same alloy—a CoNiCrTa (74/10/12/4) alloy—was prepared. In this medium having an interlayer composed of a magnetic material identical to the magnetic layer and with saturation magnetization higher than 10–50 memu/cm², no improvement in coercivity was achieved. The $M_r t$ of the medium increased by about 3–8% as the thickness of the interlayer increased, indicating that the interlayer film thickness was contributing to the total magnetic layer thickness.

From the foregoing, it can be appreciated how various objects and features on the invention are met. The invention provides an improvement in a magnetic recording medium by including in the medium an interlayer deposited between the underlayer and the magnetic recording layer. The interlayer is effective to increase the coercivity of the medium, especially at lower $M_r t$ values. The interlayer is composed of a CoCr-based alloy having a saturation magnetization substantially below that normally preferred for magnetic recording, e.g., between about 10–50 memu/cm². The interlayer is deposited to a thickness between about 10–60 Å and is homogeneous in alloy composition through the layer thickness.

The features of the present invention are illustrated using interlayers composed of CoCrTa and of CoNiCrTa and a magnetic layer of CoNiCrTa. It will be appreciated that one of skill in the art can readily determine other alloys for the interlayer and the magnetic layer.

IV. Examples

The Example is intended to illustrate but not limit the scope of the invention.

EXAMPLE 1

Preparation of Magnetic Recording Media

The magnetic recording media for the experiments conducted in support of the invention were prepared using a DC-magnetron Intevac MDP-250B sputtering apparatus as follows.

The circumferentially textured nickel-phosphorus coated aluminum substrates (95 mm×31.5 mil) heated to 270° C. using quartz heat lamps prior to sputtering 8, 5 and 4 mTorr argon pressure for deposition of the underlayer, interlayer and magnetic layer, respectively.

The media layers were sputtered sequentially from targets composed of the desired alloys. The underlayer of either chromium or 90/10 chromium/ruthenium was deposited directly on the NiP-coated substrate, followed by deposition of the interlayer and the magnetic layer, each in a separate sputtering chamber of the apparatus.

Although the invention has been described with respect to particular embodiments, it will be apparent to those skilled in the art that various changes and modifications can be made without departing from the invention.

It is claimed:

1. An improvement in a magnetic recording medium formed on a rigid substrate and having an underlayer and a magnetic recording layer deposited on the substrate, said improvement comprising an interlayer disposed between the underlayer and the magnetic recording layer, said interlayer (i) composed of a CoCr-based alloy having a saturation magnetization of between 10–50 emu/cm3 and (ii) having a thickness of between 10–60 Å, and where the CoCr-based alloy is homogeneous through the interlayer thickness.

2. The medium of claim 1, wherein said interlayer and said magnetic layer are formed from a CoCr-based alloy having the same elemental constituents in different proportions.

3. The medium of claim 2, wherein said CoCr-based alloy is CoNiCrTa.

4. The medium of claim 2, wherein said interlayer is composed of a CoCr-based alloy containing 50–60 atomic percent cobalt, 3–10 atomic percent nickel, 24–50 atomic percent chromium and 1–10 atomic percent tantalum and said magnetic layer is composed of an alloy containing 60–80 atomic percent cobalt, 3–10 atomic percent nickel, 10–20 atomic percent chromium and 2–10 atomic percent tantalum.

5. The medium of claim 2, wherein said CoCr-based alloy is composed of cobalt, chromium and tantalum.

6. The medium of claim 1, wherein said interlayer has a thickness of between 10–40 Å.

7. The medium of claim 1, wherein said underlayer is composed of chromium.

8. The medium of claim 1, wherein said underlayer is composed of an alloy containing between about 2–20% ruthenium and remainder chromium.

9. The medium of claim 1, wherein said underlayer is composed of an alloy containing between about 2–10% ruthenium and remainder chromium.

10. An improvement in a method of producing a magnetic recording medium by sputtering onto a substrate an underlayer and by sputtering onto said underlayer a magnetic thin-film layer, said improvement comprising depositing by sputter deposition an interlayer between said underlayer and said magnetic layer, said interlayer (i) composed of a CoCr-based alloy having a saturation magnetization of between 10–50 emu/cm3 and (ii) having a thickness of between 10–60 Å and where the CoCr-based alloy is homogeneous through the interlayer thickness.

11. The method of claim 10, wherein said interlayer and said magnetic layer are formed from a CoCr-based alloy having the same elemental constituents in different proportions.

12. The method of claim 11, wherein said CoCr-based alloy is CoNiCrTa.

13. The method of claim 12, wherein said interlayer is composed of an alloy containing 50–60 atomic percent cobalt, 3–10 atomic percent nickel, 24–50 atomic percent chromium and 1–10 atomic percent tantalum and said magnetic layer is composed of an alloy containing 60–80 atomic percent cobalt, 3–10 atomic percent nickel, 10–20 atomic percent chromium and 2–10 atomic percent tantalum.

14. The method of claim 11, wherein said CoCr-based alloy is composed of cobalt, chromium and tantalum.

15. The method of claim 10, wherein said interlayer has a thickness of between 10–40 Å.

16. The method of claim 10, wherein said underlayer is composed of chromium.

17. The method of claim 10, wherein said underlayer is composed of an alloy containing between about 2–20% ruthenium and remainder chromium.

18. The method of claim 10, wherein said underlayer is composed of an alloy containing between about 2–10% ruthenium and remainder chromium.

* * * * *